US006826044B2

United States Patent
Gan et al.

(10) Patent No.: US 6,826,044 B2
(45) Date of Patent: Nov. 30, 2004

(54) COMPUTER ENCLOSURE INCORPORATING SLIDABLE DRIVE BRACKET

(75) Inventors: Li-Yuan Gan, Shenzhen (CN);
Guang-Yi Zhang, Shenzhen (CN);
Wen-Bin Liu, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/305,752

(22) Filed: Nov. 27, 2002

(65) Prior Publication Data

US 2004/0017651 A1 Jan. 29, 2004

(30) Foreign Application Priority Data

Jul. 26, 2002 (TW) ........................... 91211452 U

(51) Int. Cl.⁷ .................................................. G06F 1/16
(52) U.S. Cl. ....................................... 361/685; 361/683
(58) Field of Search ................................. 361/683–686

(56) References Cited

U.S. PATENT DOCUMENTS 5,332,306 A * 7/1994 Babb et al. ............ 312/334.16

\* cited by examiner

Primary Examiner—Yean-Hsi Chang
(74) Attorney, Agent, or Firm—Wei Te Chung

(57) ABSTRACT

A computer enclosure includes a cage (10) and a drive bracket (40). The cage has two side panels (22), and each side panel forms a first slideway (26) and an aligned second slideway (30). Each first slideway includes a blocking portion (28). The drive bracket has two side walls (42). Each side wall attachingly receives a first sliding member (60), and forms a second sliding member (80). A slot (66) is defined in each first sliding member, thereby forming an elastic portion. A handle (68) is formed at a front end of the elastic portion, and a barb (72) protrudes from a top face of the elastic portion. In assembly, the drive bracket is pushed into the cage, with the second and first sliding members sliding along the second and first slideways. The barbs engage with the blocking portions, thus preventing the drive bracket from accidentally detaching from the cage.

9 Claims, 5 Drawing Sheets

US 6,826,044 B2

COMPUTER ENCLOSURE INCORPORATING SLIDABLE DRIVE BRACKET

BACKGROUND OF THE INVENTION

1. Field of the Invention

The present invention relates to computer enclosures, and particularly to a computer enclosure having a slidable drive bracket.

2. Related Art

Various data storage devices are installed in computers for electronic communication and handling of data. Drive brackets are often used to support and secure such data storage devices inside the computers.

In a typical computer, drive brackets are fixed in an enclosure of the computer by screws or fasteners. Taiwan Patent application no. 89216297 discloses a conventional computer enclosure comprising a cage and a bracket. The cage defines a plurality of fixing holes, and the bracket includes a base and two separable frames. The base defines a plurality of screw holes. Fixing edges depend from two sides of the frames, and the fixing edges define a plurality of fixing openings. A plurality of setscrews is received through the fixing openings of the fixing edges and engaged in the screw holes of the base, thereby fixing the two frames to the base. A plurality of setscrews are used to fix the bracket into the cage in similar fashion.

However, using screws to mount the frame onto the base is laborious and time-consuming. In addition, when a user wants to modify or maintain a component in the computer, removal of the screws is inconvenient. Similarly, using screws to attach a bracket in a computer enclosure is laborious and time-consuming. Moreover, production and assembly of these modularized brackets is complicated and costly.

SUMMARY OF THE INVENTION

Accordingly, an object of the present invention is to provide a computer enclosure having a slidable drive bracket which readily and securely accommodates data storage devices therein.

To achieve the above-mentioned object, a computer enclosure in accordance with the present invention includes a cage and a drive bracket. The cage has a pair of side panels, and each side panel forms a first slideway and a second slideway in alignment with the first slideway. Each first slideway comprises a blocking portion at a front extremity thereof. A cutout is defined in each side panel at a front of the corresponding second slideway. The drive bracket has a pair of side walls slidably received in the cage. A pair of first sliding members is fixed on the side walls of the drive bracket. A pair of second sliding members is formed on the side walls rearwardly of the respective first sliding members. Each first sliding member is elongated. A slot is defined in the first sliding member, thereby forming an elastic portion. A handle is formed at a front end of the elastic portion, and a barb protrudes from a top face of the elastic portion. In assembly of the computer enclosure, the second sliding members are inserted through the cutouts of the cage. The drive bracket is then pushed into the cage, with the second sliding members sliding along the second slideways, and the first sliding members sliding along the first slideways. The barbs engage with the blocking portions, thus preventing the drive bracket from accidentally detaching from the cage.

Other objects, advantages and novel features of the present invention will be drawn from the following detailed description of a preferred embodiment of the present invention with attached drawings, in which:

DESCRIPTION OF THE PREFERRED EMBODIMENT

Figure 1:
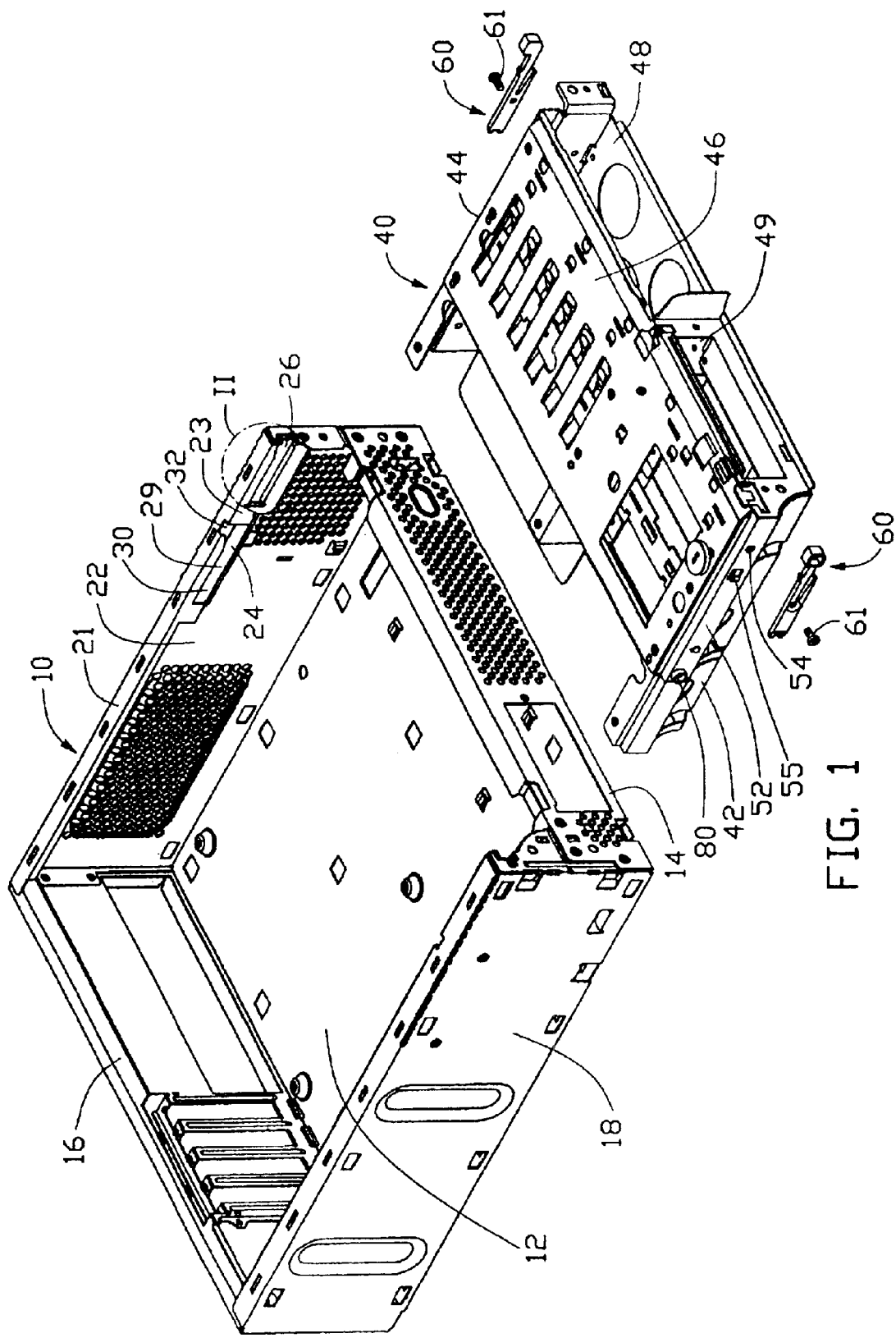
FIG. 1 is an exploded isometric view of a computer enclosure in accordance with the present invention.
Figure 2:
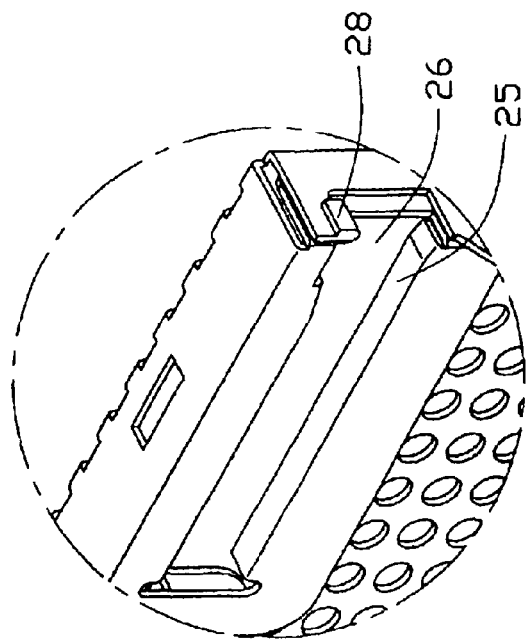
FIG. 2 is an enlarged view of an encircled portion II of FIG. 1.
Figure 3:
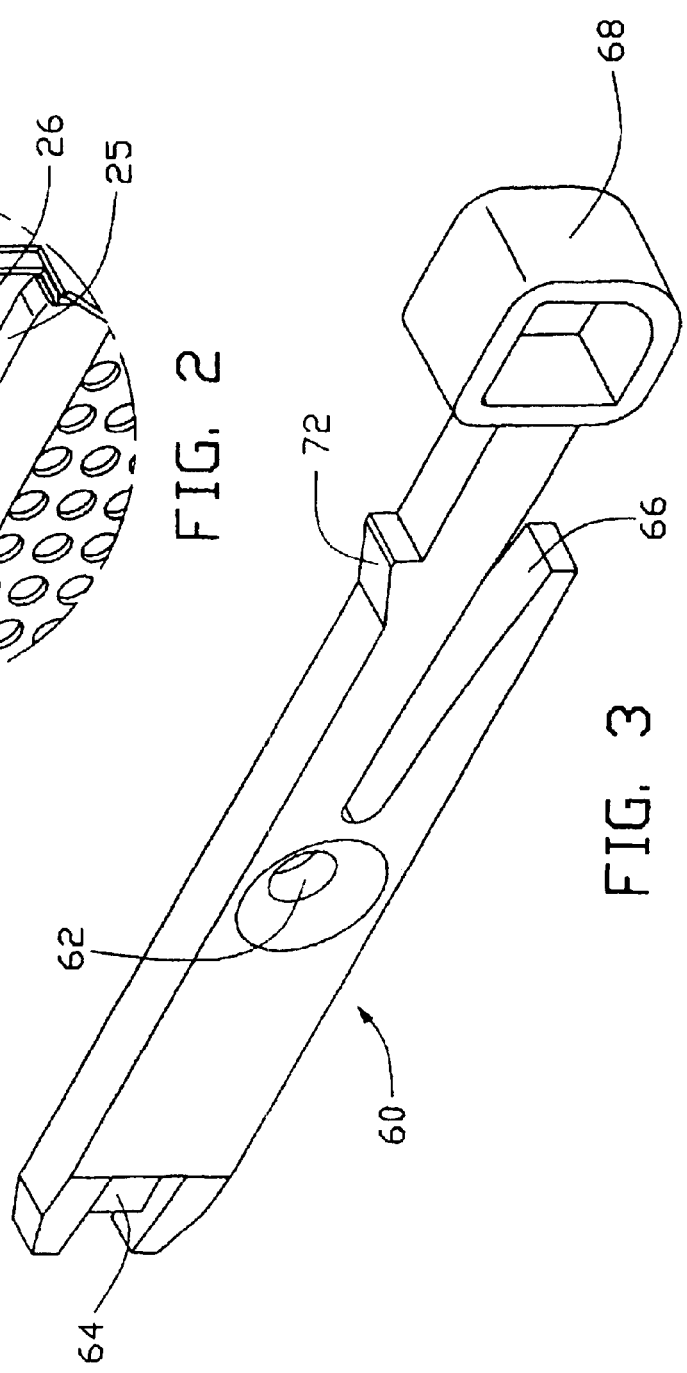
FIG. 3 is an enlarged isometric view of a first sliding member of the enclosure of FIG. 1.

Referring to FIGS. 1–3, a computer enclosure in accordance with the present invention comprises a cage 10 and a drive bracket 40.

The cage 10 has a bottom panel 12, a front panel 14, a rear panel 16 and a pair of side panels 18, 22. A top extremity of the front panel 14 is lower than top extremities of the side panels 18, 22. An entrance (not labeled) is thereby defined above the front panel 14 between the side panels 18, 22, for receiving the drive bracket 40 therethrough. The side panels 18, 22 have similar and symmetrically corresponding configurations; therefore, only the side panel 22 is described in detail hereafter. The side panel 22 comprises a beam 21 extending perpendicularly inwardly from a top edge thereof, and a first flange 23 depending from an inmost side edge of the beam 21. A pair of parallel second flanges 25 extends perpendicularly inwardly from upper and lower regions of a front portion of the first flange 23 toward the side panel 22. The second flanges 25 cooperatively define a first slideway 26 therebetween. A blocking portion 28 is formed at a front extremity of an uppermost one of the second flanges 25, and projects down slightly into the first slideway 26. A third flange 24 extends perpendicularly inwardly from a bottom edge of a rear portion of the first flange 23 toward the side panel 22. A horizontal slot 29 is defined in the first flange 23 adjacent the third flange 24. The first and third flanges 23, 24 cooperatively define a second slideway 30 therebetween at the slot 29. A cutout 32 is defined in the beam 21, at a front end of the slot 29 and in communication with the slot 29.

The drive bracket 40 can be slidingly received in the cage 10 along the first and second slideways 26, 30. The drive bracket 40 has a pair of side walls 42, 44, an upper wall 46, a bottom wall 48, and a separator wall 49 parallel to and approximately midway between the side walls 42, 44. The side walls 42, 44 and separator wall 49 cooperatively define a pair of spaces therebetween, for holding data storage devices therein. The side walls 42, 44 respectively protrude progressively outwardly from bottom to top, thereby forming a pair of fixing walls 52 respectively. A fixing hole 54 is defined in a front portion of each fixing wall 52. A hook 55 is outwardly formed from each fixing wall 42 behind the fixing hole 54.

A pair of first sliding members 60 is attached on forward portions of the fixing walls 52 respectively. Each first sliding member 60 is elongated. A recess 64 is defined at a rear end of the first sliding member 60, corresponding to the hook 55 of the drive bracket 40. A narrow horizontal slot 66 is defined in a front end of the first sliding member 60, thereby forming an elastic portion of the first sliding member 60. A barb 72 protrudes from a front portion of a top face of the elastic portion. A handle 68 is form at a front end of the elastic portion. The handle 68 is hollow, in order to facilitate operation thereof and reduce a weight thereof. A through hole 62 is defined in a middle portion of the first sliding member 60, for extension of a setscrew 61 therethrough.

A pair of second sliding members 80 is outwardly formed from rear portions of the fixing walls 52 respectively. Each second sliding member 80 is directly punched from its corresponding fixing wall 52, and is substantially a hollow cylinder.

Figure 4:
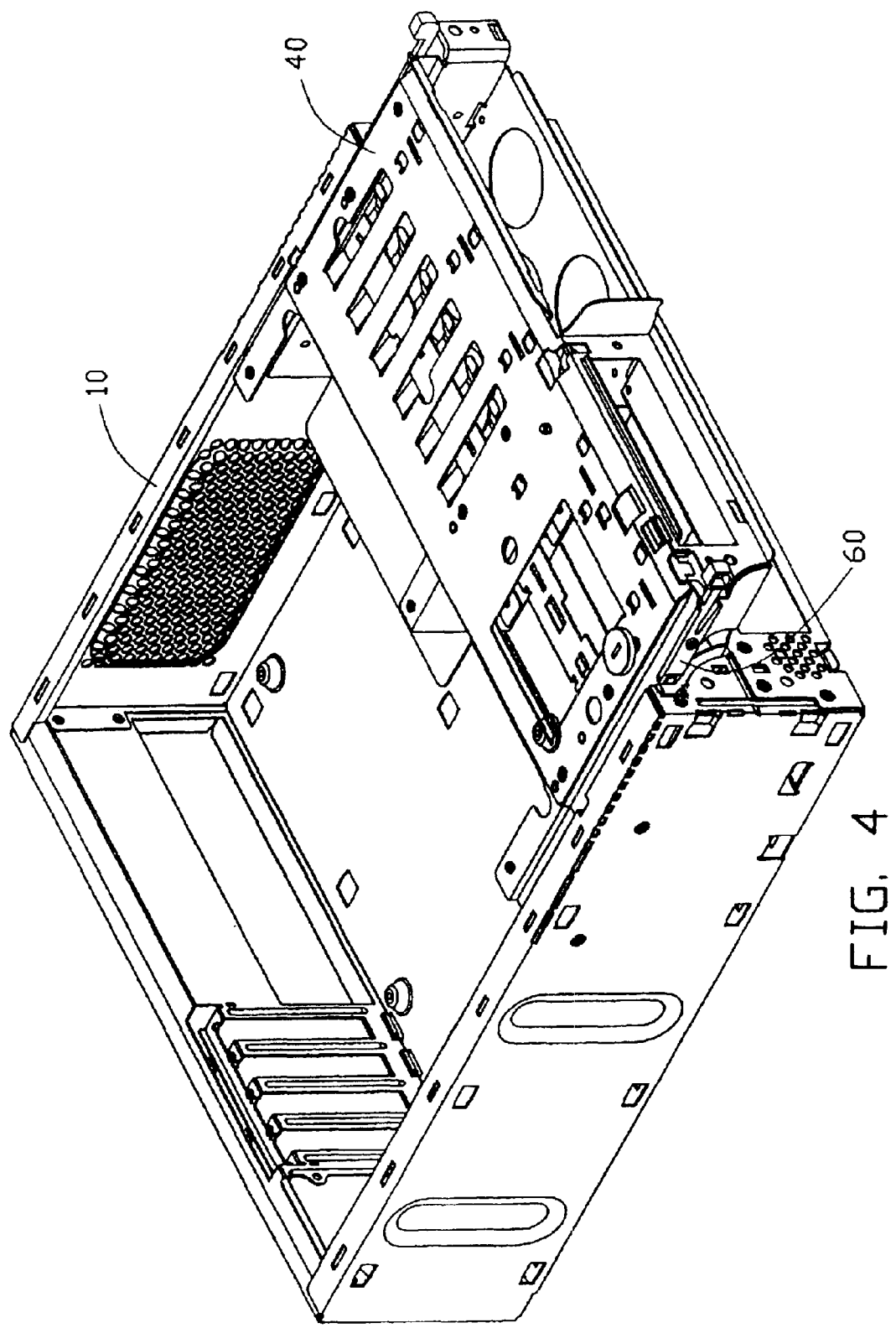
FIG. 4 is a partly assembled view of FIG. 1.
Figure 5:
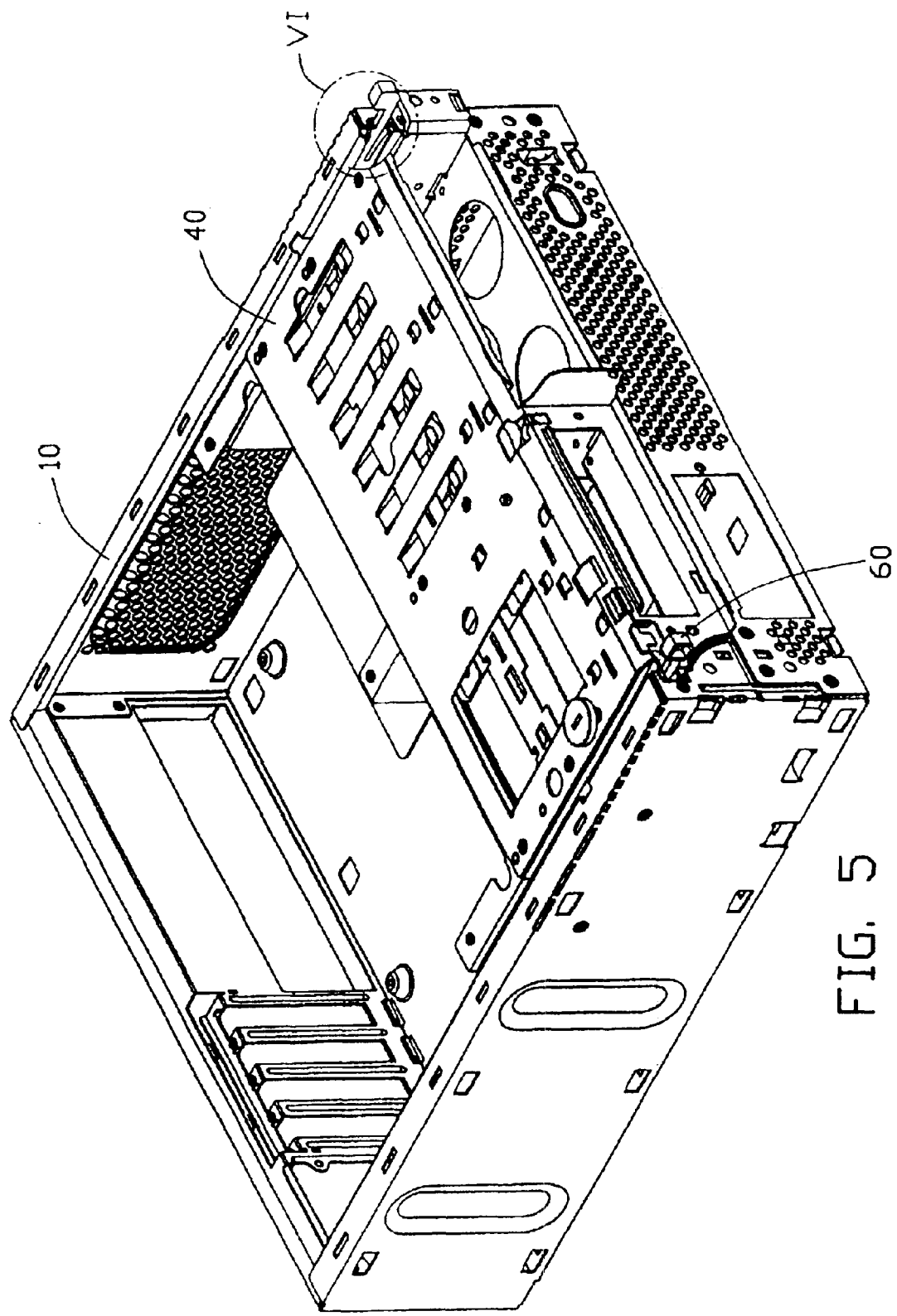
FIG. 5 is a fully assembled view of FIG. 1.
Figure 6:
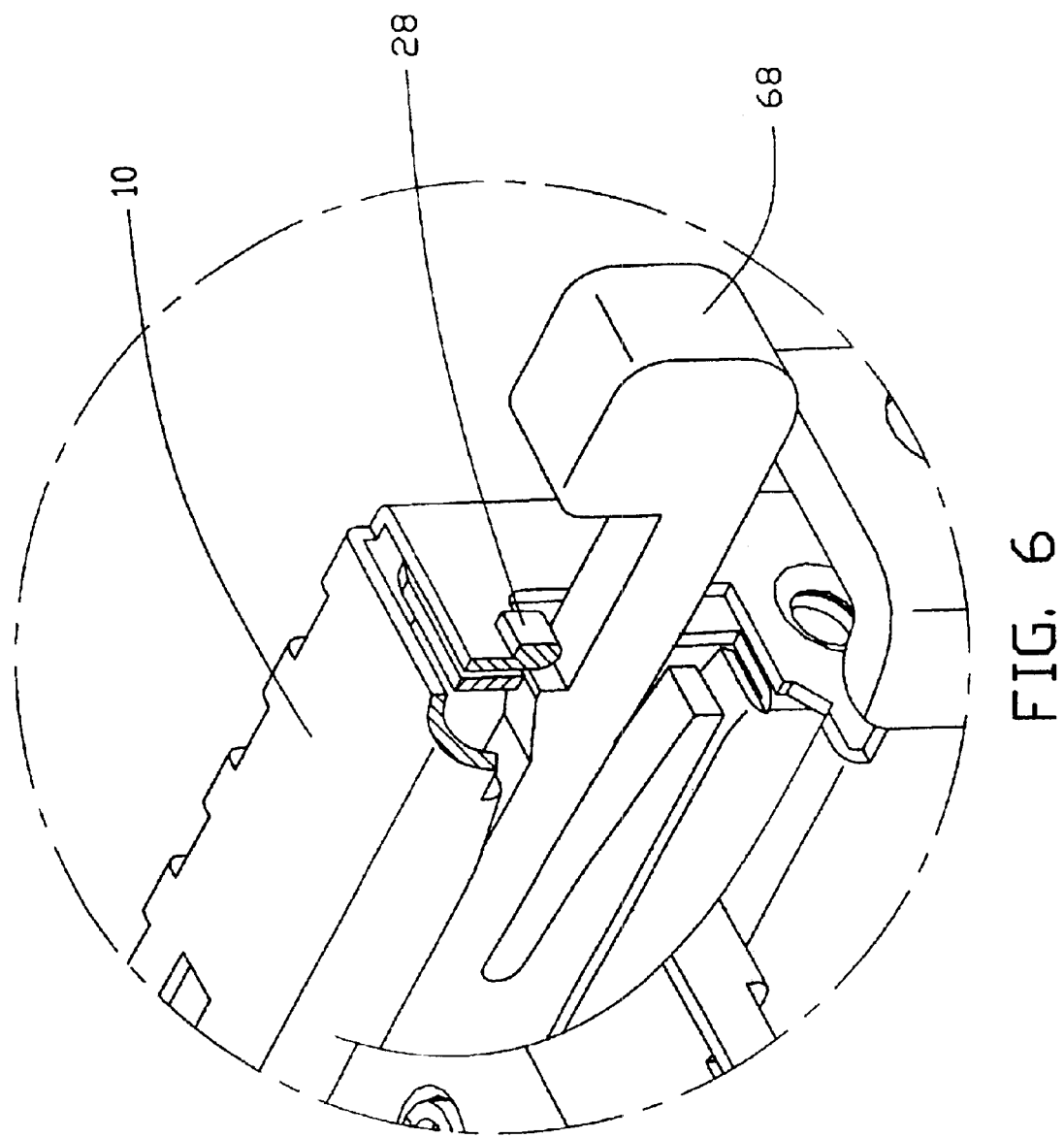
FIG. 6 is an enlarged view of an encircled portion VI of FIG. 5.

Referring also to FIGS. 4 and 5, in assembly, each first sliding member 60 is placed against its corresponding fixing wall 52 of the drive bracket 40, so that the recess 64 of the first sliding member 60 receives the hook 55 of the corresponding fixing wall 52. One of the setscrews 61 is then passed through the through hole 62 of the first sliding member 60 to engage in the fixing hole 54 of the corresponding fixing wall 52. The first sliding members 60 are thus fixed to the drive bracket 40. The second sliding members 80 of the drive bracket 40 are then inserted through the cutouts 32 of the cage 10. The drive bracket 40 is then pushed into the cage 10, with the second sliding members 80 sliding along the second slideways 30, and the first sliding members 60 sliding along the first slideways 26. When the first sliding members 60 have completely slid into the first slideways 26, the barbs 72 of the first sliding members 60 engage with rear sides of the blocking portions 28 of the cage 10 respectively. The drive bracket 40 is thereby prevented from accidentally detaching from the cage 10.

In disassembly, the handles 68 of the first sliding members 60 are pressed downwardly to release the barbs 72 from the blocking portions 28. The drive bracket 40 is then easily slid out and removed from the cage 10.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A computer enclosure comprising:
   a cage comprising a pair of side panels, each of the side panels comprising a first slideway, the first slideway having a blocking portion at an end thereof; and
   a drive bracket slidably received in the cage, the drive bracket comprising two side walls, two first sliding members attached to the respective side walls, each of the first sliding members having a handle and further having a barb engaging with the blocking portion of a corresponding first slideway, wherein each of the side walls defines a fixing hole and forms a hook, for attachment of a corresponding first sliding member;
   wherein when the handles of the first sliding members are downwardly pressed, the barbs are released from the corresponding blocking portions, whereby the drive bracket is removable from the cage.

2. The computer enclosure as claimed in claim 1, wherein each of the side panels of the cage further comprises a second slideway in alignment with the first slideway, and each of the side walls of the drive bracket comprises a second sliding member slidably received in a corresponding second slideway.

3. The computer enclosure as claimed in claim 2, wherein each of the side panels of the cage further comprises a horizontal beam and a first flange depending from the beam, and corresponding first and second slideways are defined at the first flange.

4. The computer enclosure as claimed in claim 3, wherein each of the beams defines a cutout in communication with a corresponding second slideway.

5. The computer enclosure as claimed in claim 1, wherein each of the first sliding members defines a slot in a front end thereof thereby forming an elastic portion.

6. The computer enclosure as claimed in claim 1, wherein each of the first sliding members defines a recess at a rear end thereof, the recess engagingly receiving the hook of a corresponding side wall of the drive bracket.

7. The computer enclosure as claimed in claim 6, wherein each of the first sliding members defines a through hole in a middle portion thereof.

8. A computer enclosure comprising:
   a cage including spaced opposite side panels, each of said side panels defining spaced inner and outer slideways;
   a cutout formed in each of said side panels to communicate the corresponding inner slideway with an exterior;
   a drive bracket including a pair of spaced side walls, each of said side walls including spaced inner and outer slide members;
   a releasable latch formed on each of the outer slide members; wherein
   the drive bracket is able to be assembled to the cage initially at an angle to have the inner slide member enter the inner slideway via the corresponding cutout and have the outer slide member spaced far away from the outer slideway without interference, and successively rotated to a horizontal direction to have the inner slide member move along the inner slideway and the outer slide member move along the outer slideway until the latch is engaged with cage, wherein said inner slide member can not enter the outer slideway when said drive bracket is withdrawn from the cage.

9. The computer enclosure as claimed in claim 8, wherein inner slideway defines a sliding direction therealong, and the corresponding cutout allows said inner slideway to communicate with the exterior in a direction perpendicular to said sliding direction.

* * * * *